US012346744B2

(12) United States Patent
Tomoda

(10) Patent No.: US 12,346,744 B2
(45) Date of Patent: Jul. 1, 2025

(54) PREDICTING PERFORMANCE LEVEL SATISFACTILON OF PREDETERMINED SERVICE

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 625 days.

(21) Appl. No.: 17/414,317

(22) PCT Filed: Jun. 26, 2020

(86) PCT No.: PCT/JP2020/025266
§ 371 (c)(1),
(2) Date: Jun. 15, 2021

(87) PCT Pub. No.: WO2021/260924
PCT Pub. Date: Dec. 30, 2021

(65) Prior Publication Data
US 2022/0308934 A1 Sep. 29, 2022

(51) Int. Cl.
G06F 9/50 (2006.01)
(52) U.S. Cl.
CPC .......... G06F 9/5077 (2013.01); G06F 9/5016 (2013.01)
(58) Field of Classification Search
CPC .............................. G06F 9/5077; G06F 9/5016
See application file for complete search history.

(56) References Cited

U.S. PATENT DOCUMENTS

| 2012/0137002 A1* | 5/2012 | Ferris | G06F 9/5072 709/226 |
| 2015/0347940 A1* | 12/2015 | Doganata | G06Q 10/06311 705/7.13 |
| 2015/0348065 A1* | 12/2015 | Doganata | G06Q 30/0202 705/7.31 |
| 2016/0070590 A1 | 3/2016 | Eicher et al. | |
| 2016/0071023 A1 | 3/2016 | Eicher et al. | |
| 2016/0072910 A1 | 3/2016 | Eicher et al. | |
| 2016/0379125 A1* | 12/2016 | Bordawekar | G06F 9/5027 706/12 |
| 2018/0139271 A1* | 5/2018 | Kumar | H04L 67/1021 |

(Continued)

FOREIGN PATENT DOCUMENTS

| CN | 107077385 A | 8/2017 |
| CN | 110895491 A | 3/2020 |

(Continued)

OTHER PUBLICATIONS

Office Action of Sep. 1, 2022, for corresponding TW Patent Application No. 110121172, pp. 1-9.

(Continued)

Primary Examiner — Benjamin C Wu
(74) Attorney, Agent, or Firm — HEA Law PLLC

(57) ABSTRACT

A prediction system, with at least one processor configured to: acquire a plurality of candidates of information influencing an ease of obtaining a desired result in a predetermined service; predict, for each of the plurality of candidates, based on a predetermined prediction method, whether the desired result is obtained; and identify the candidates predicted to obtain the desired result.

13 Claims, 13 Drawing Sheets

(56) References Cited

U.S. PATENT DOCUMENTS

| | | | |
|---|---|---|---|
| 2019/0132256 A1 | 5/2019 | Wada et al. | |
| 2020/0042920 A1* | 2/2020 | Moorthy | G06Q 30/0202 |
| 2020/0081740 A1 | 3/2020 | Wada et al. | |
| 2021/0312277 A1* | 10/2021 | Prabhudesai | G06F 11/3466 |
| 2022/0261661 A1* | 8/2022 | Khaligh | G06Q 10/0631 |
| 2024/0054019 A1* | 2/2024 | Ohayon | G06F 9/5005 |
| 2024/0135161 A1* | 4/2024 | Mysore Jayaram | G06N 3/08 |

FOREIGN PATENT DOCUMENTS

| | | |
|---|---|---|
| JP | H10269294 A | 10/1998 |
| JP | 2015138484 A | 7/2015 |
| JP | 2017527037 A | 9/2017 |
| JP | 2019082801 A | 5/2019 |
| JP | 2020042651 A | 3/2020 |

OTHER PUBLICATIONS

"Matsumotokiyoshi HD + IBM" IBM Spss Modeler + IBM Campaign, Nikkei x Tech Expo 2019, Oct. 9, 2019 (accession date), pp. 1-4 especially, pp. 3-4 (See partial translation).

* cited by examiner

FIG.2

RESOURCE SETTING SCREEN

THE RELATIONSHIP BETWEEN THE RESOURCE CANDIDATES OF THE CLOUD SYSTEM AND THE PREDICTION RESULTS IS AS FOLLOWS

| RESOURCE CANDIDATES | | | SERVICE LEVEL AGREEMENT |
|---|---|---|---|
| No | CPU | MEMORY | |
| 1 | 4.00GHz 40MB 24CORES 50THREADS | 2TB | O |
| 2 | 3.80GHz 35MB 22CORES 45THREADS | 1.8TB | O |
| 3 | 3.20GHz 30MB 20CORES 35THREADS | 1.5TB | O |
| 4 | 3.00GHz 25MB 18CORES 30THREADS | 1.3TB | × |
| 5 | 2.80GHz 22MB 18CORES 25THREADS | 1.1TB | × |
| 6 | 2.50GHz 20MB 15CORES 18THREADS | 1.0TB | × |

SELECT YOUR SYSTEM RESOURCE

No.3 (3.20GHz 30MB 20CORES 35THREADS, 1.5TB) ▼     OK

FIG.4

| SETTING OF CLOUD SYSTEM | SITUATION OF CLOUD SYSTEM | SETTING OF ANOTHER SYSTEM | SITUATION OF ANOTHER SYSTEM | RESOURCE CPU | RESOURCE MEMORY | SERVICE LEVEL AGREEMENT |
|---|---|---|---|---|---|---|
| SETTING VALUE 1a | SITUATION 1a | SETTING VALUE 1b | SITUATION 1b | 4.00GHz 40MB 24CORES 50THREADS | 2TB | ○ |
| SETTING VALUE 2a | SITUATION 2a | SETTING VALUE 2b | SITUATION 2b | 4.00GHz 40MB 24CORES 48THREADS | 2TB | ○ |
| SETTING VALUE 3a | SITUATION 3a | SETTING VALUE 3b | SITUATION 3b | 4.00GHz 40MB 24CORES 46THREADS | 2TB | ○ |
| ... | ... | ... | ... | ... | ... | ... |
| SETTING VALUE 30a | SITUATION 30a | SETTING VALUE 30b | SITUATION 30b | 3.20GHz 30MB 20CORES 35THREADS | 1.5TB | ○ |
| SETTING VALUE 31a | SITUATION 31a | SETTING VALUE 31b | SITUATION 31b | 3.00GHz 25MB 18CORES 30THREADS | 1.5TB | × |
| SETTING VALUE 32a | SITUATION 32a | SETTING VALUE 32b | SITUATION 32b | 3.00GHz 25MB 18CORES 28THREADS | 1.5TB | × |
| ... | ... | ... | ... | ... | ... | ... |

DS1

INPUT DATA / OUTPUT DATA

FIG.5

| RESOURCE CANDIDATES | | COST |
|---|---|---|
| CPU | MEMORY | |
| 4.00GHz 40MB 24CORES 50THREADS | 2TB | 1,000,000 YEN |
| 3.80GHz 35MB 22CORES 45THREADS | 1.8TB | 900,000 YEN |
| 3.20GHz 30MB 20CORES 35THREADS | 1.5TB | 850,000 YEN |
| 3.00GHz 25MB 18CORES 30THREADS | 1.3TB | 800,000 YEN |
| 2.80GHz 22MB 18CORES 25THREADS | 1.1TB | 750,000 YEN |
| 2.50GHz 20MB 15CORES 18THREADS | 1.0TB | 700,000 YEN |
| ⋮ | ⋮ | ⋮ |

| GENDER | USER ATTRIBUTE | | | | ... | USAGE SITUATION OF ELECTRONIC PAYMENT SERVICE | USAGE SITUATION OF ANOTHER SERVICE | DEFECTION RATE |
| --- | --- | --- | --- | --- | --- | --- | --- | --- |
| | AGE | RESIDENTIAL AREA | INCOME | OCCUPATION | | | | |
| MALE | 25 | TOKYO | 5,000,000 YEN | COMPANY WORKER | ... | 400 YEN | 2,500 YEN | 80% |
| MALE | 38 | SAITAMA | 8,000,000 YEN | COMPANY WORKER | ... | 18,000 YEN | 35,000 YEN | 75% |
| FEMALE | 18 | FUKUOKA | 400,000 YEN | STUDENT | ... | 300 YEN | 1,500 YEN | 10% |
| FEMALE | 45 | TOKYO | 6,000,000 YEN | COMPANY WORKER | ... | 4,500 YEN | 3,000 YEN | 30% |
| ... | ... | ... | ... | ... | ... | ... | ... | ... |

DS2

INPUT DATA / OUTPUT DATA

FIG.10

| | USER ATTRIBUTE | | | | USAGE SITUATION OF ELECTRONIC PAYMENT SERVICE | EXPECTED PROFIT |
|---|---|---|---|---|---|---|
| GENDER | AGE | RESIDENTIAL AREA | INCOME | OCCUPATION | | |
| MALE | 25 | TOKYO | 5,000,000 YEN | COMPANY WORKER | ... | ... |
| MALE | 38 | SAITAMA | 8,000,000 YEN | COMPANY WORKER | ... | 400 YEN | 50 YEN |
| FEMALE | 18 | FUKUOKA | 400,000 YEN | STUDENT | ... | 18,000 YEN | 2,000 YEN |
| FEMALE | 45 | TOKYO | 6,000,000 YEN | COMPANY WORKER | ... | 300 YEN | 25 YEN |
| ... | ... | ... | ... | ... | ... | 4,500 YEN | 300 YEN |
| | | | | | ... | ... |

DS3

INPUT DATA / OUTPUT DATA

FIG.11

| DEFECTION RATE | USER ATTRIBUTE | | | | | | USAGE SITUATION OF ELECTRONIC PAYMENT SERVICE | CONFERRED POINTS | CONTINUED USAGE |
|---|---|---|---|---|---|---|---|---|---|
| | GENDER | AGE | RESIDENTIAL AREA | INCOME | OCCUPATION | ... | | | |
| 80% | MALE | 25 | TOKYO | 5,000,000 YEN | COMPANY WORKER | ... | 400 YEN | 20pt | DORMANT |
| 75% | MALE | 38 | SAITAMA | 8,000,000 YEN | COMPANY WORKER | ... | 18,000 YEN | 600pt | CONTINUE |
| 10% | FEMALE | 18 | FUKUOKA | 400,000 YEN | STUDENT | ... | 300 YEN | 5pt | CONTINUE |
| 30% | FEMALE | 45 | TOKYO | 6,000,000 YEN | COMPANY WORKER | ... | 4,500 YEN | 60pt | DORMANT |
| ... | ... | ... | ... | ... | ... | ... | ... | ... | ... |

DS4

INPUT DATA / OUTPUT DATA

FIG.12

| USER ID | DEFECTION RATE | USER ATTRIBUTE ||||| USAGE SITUATION OF ELECTRONIC PAYMENT SERVICE | CONFERRED POINTS | CONTINUED USAGE |
| --- | --- | --- | --- | --- | --- | --- | --- | --- | --- |
| | | GENDER | AGE | RESIDENTIAL AREA | INCOME | OCCUPATION | | | |
| u00001 | 72% | MALE | 42 | TOKYO | 10,000,000 YEN | COMPANY WORKER | ... | 15,000 YEN | 1000 | CONTINUE |
| | | | | | | | | | 999 | CONTINUE |
| | | | | | | | | | 998 | CONTINUE |
| | | | | | | | | | ... | ... |
| | | | | | | | | | 802 | CONTINUE |
| | | | | | | | | | 801 | CONTINUE |
| | | | | | | | | | 800 | CONTINUE |
| | | | | | | | | | 799 | DORMANT |
| | | | | | | | | | 798 | DORMANT |
| | | | | | | | | | 797 | DORMANT |
| | | | | | | | | | ... | ... |

D2

PREDICTING PERFORMANCE LEVEL SATISFACTILON OF PREDETERMINED SERVICE

CROSS REFERENCE TO RELATED APPLICATIONS

This application is a National Stage of International Application No. PCT/JP2020/025266 filed on Jun. 26, 2020. The contents of the above document is incorporated herein by reference in its entirety.

TECHNICAL FIELD

The present disclosure relates to a prediction system, a prediction method, and a program.

BACKGROUND ART

Hitherto, technologies for obtaining a desired result in a service are known. For example, in Patent Literature 1, there is described a service level management system for a cloud service configured to provide an IT resource via a network, in which the service level management system concludes a service level agreement of a cloud service to be provided by a business entity to a customer and provides the IT resource to the customer. In the service level management system, satisfaction of the service level agreement by the cloud service corresponds to obtaining a desired result.

CITATION LIST

Patent Literature

[PTL 1] JP 2015-138484 A

SUMMARY OF INVENTION

Technical Problem

However, in the technology of Patent Literature 1, the IT resource required in order to satisfy the service level agreement is determined based on human experience, and there are cases in which an IT resource not satisfying the service level agreement is adopted. For that reason, in the related-art technology, there have been cases in which the desired result is not obtainable in the service.

It is an object of the present disclosure to obtain a desired result in a service.

Solution to Problem

According to one aspect of the present disclosure, there is provided a prediction system including: candidate acquisition means for acquiring a plurality of candidates of information influencing an ease of obtaining a desired result in a predetermined service; prediction means for predicting, for each of the plurality of candidates, based on a predetermined prediction method, whether the desired result is obtained; and identification means for identifying the candidates predicted to obtain the desired result.

According to one aspect of the present disclosure, there is provided a prediction method including: a candidate acquisition step of acquiring a plurality of candidates of information influencing an ease of obtaining a desired result in a predetermined service; a prediction step of predicting, for each of the plurality of candidates, based on a predetermined prediction method, whether the desired result is obtained; and an identification step of identifying the candidates predicted to obtain the desired result.

According to one aspect of the present disclosure, there is provided a program for causing a computer to function as: candidate acquisition means for acquiring a plurality of candidates of information influencing an ease of obtaining a desired result in a predetermined service; prediction means for predicting, for each of the plurality of candidates, based on a predetermined prediction method, whether the desired result is obtained; and identification means for identifying the candidates predicted to obtain the desired result.

According to one aspect of the present disclosure, as a value indicated by the information becomes higher, the desired result is obtained more easily and a cost relating to the predetermined service becomes higher, and the identification means is configured to identify the candidate which is predicted to obtain the desired result, and which has a relatively low cost.

According to one aspect of the present disclosure, the identification means is configured to identify the candidate having a lowest cost among the candidates predicted to obtain the desired result.

According to one aspect of the present disclosure, the prediction means is configured to predict, for each of the plurality of candidates, whether the desired result is obtained by using a prediction model trained based on training data in which the information is input and whether the desired result is obtained is output.

According to one aspect of the present disclosure, the information indicates a resource of a system used in the predetermined service, the desired result is satisfaction of a reference relating to the predetermined service, the prediction means is configured to predict, for each of the plurality of candidates, whether the reference is satisfied, and the identification means is configured to identify the candidate predicted to satisfy the reference.

According to one aspect of the present disclosure, the prediction means is configured to predict whether the reference is satisfied based on at least one of a setting of a system used in the predetermined service, a situation predicted for the system, a setting of another system on which the system depends, and a situation predicted for the another system, and based on the candidate.

According to one aspect of the present disclosure, the information indicates a privilege to be conferred to a user of the predetermined service, the desired result is that the user continues to use the predetermined service, the prediction means is configured to predict, for each of the plurality of candidates, whether the user continues to use the predetermined service, and the identification means is configured to identify the candidate for which it is predicted that the user continues to use the predetermined service.

According to one aspect of the present disclosure, the prediction system further includes: defection rate calculation means for calculating a defection rate of the user from the predetermined service based on a predetermined calculation method; and maximum value calculation means for calculating a maximum value of the privilege conferrable to the user based on the defection rate, and the identification means is configured to identify, within a range of the maximum value, the candidate for which it is predicted that the user continues to use the predetermined service.

According to one aspect of the present disclosure, the defection rate calculation means is configured to determine the defection rate based on at least one of an attribute of the user, a usage situation of the predetermined service by the user, and a usage situation of another service by the user.

According to one aspect of the present disclosure, the prediction system further includes expected profit calculation means for calculating an expected profit of the user based on a predetermined calculation method, and the identification means is configured to identify, based on the expected profit, the candidate for which it is predicted that the user continues to use the predetermined service.

According to one aspect of the present disclosure, the prediction system further includes maximum value calculation means for calculating a maximum value of the privilege conferrable to the user based on the expected profit, and the identification means is configured to identify, within a range of the maximum value corresponding to the expected profit, the candidate for which it is predicted that the user continues to use the predetermined service.

According to one aspect of the present disclosure, the prediction means is configured to predict whether the user continues to use the predetermined service based on at least one of a defection rate of the user from the predetermined service, an attribute of the user, a usage situation of the predetermined service by the user, and a usage situation of another service by the user.

Advantageous Effects of Invention

According to the present disclosure, it is possible to obtain the desired result in the service.

BRIEF DESCRIPTION OF DRAWINGS

FIG. 2 is a diagram for illustrating an example of a resource setting screen.

FIG. 4 is a table for showing a data storage example of a training data set.

FIG. 5 is a table for showing a data storage example of resource candidate data.

FIG. 9 is a table for showing a data storage example of a training data set of a defection rate calculation model.

FIG. 10 is a table for showing a data storage example of a training data set of an expected profit calculation model.

FIG. 11 is a table for showing a data storage example of a training data set of a prediction model.

FIG. 12 is a table for showing processing contents of an identification module in the second embodiment.

DESCRIPTION OF EMBODIMENTS

1. First Embodiment

Description is now given of an example of a prediction system according to a first embodiment of the present disclosure.

[1-1. Overall Configuration of Prediction System]

Figure 1:
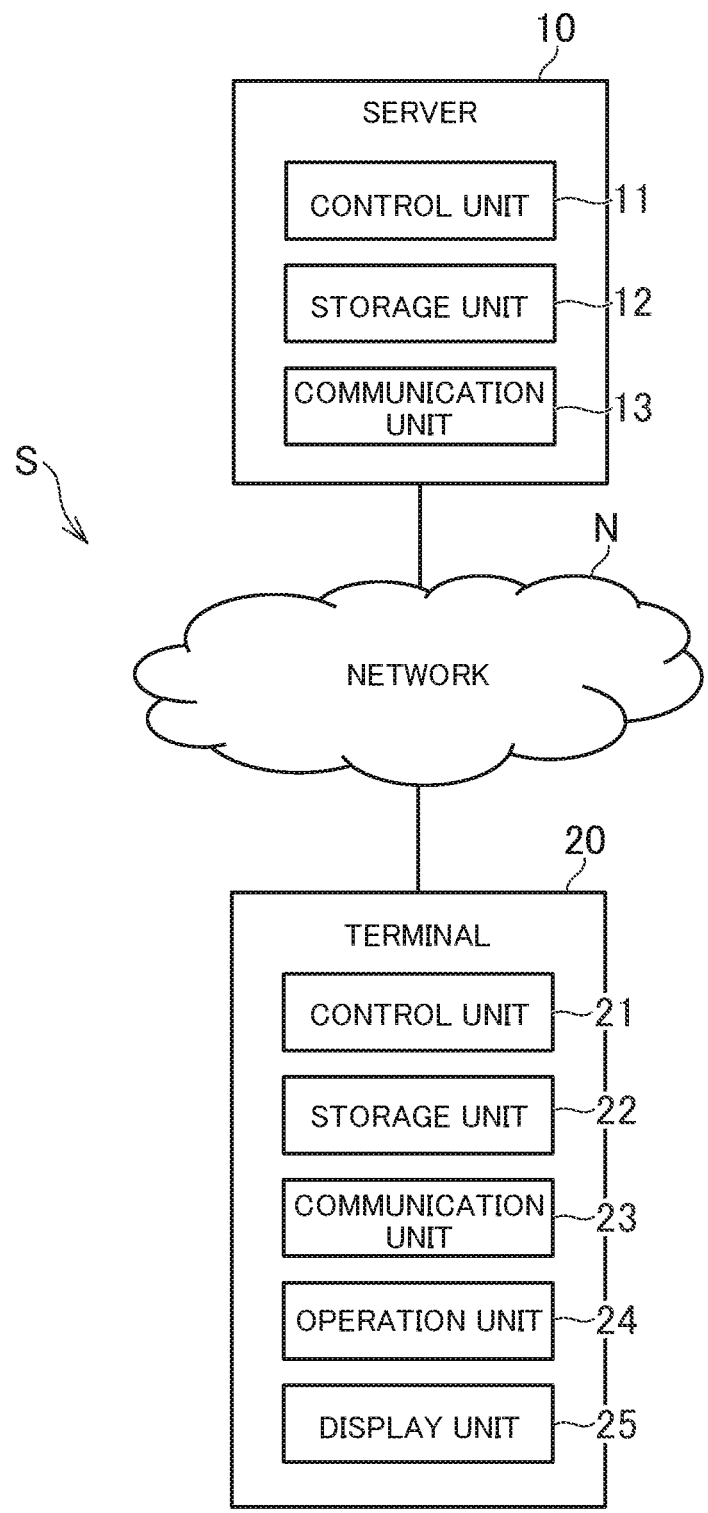
FIG. 1 is a diagram for illustrating an overall configuration of a prediction system.

FIG. 1 is a diagram for illustrating an overall configuration of the prediction system. As illustrated in FIG. 1, a prediction system S includes a server 10 and a terminal 20. Each of those components is connected to a network N, for example, the Internet or a LAN. In FIG. 1, there is illustrated one server 10 and one terminal 20, but there may be a plurality of those components.

The server 10 is a server computer. For example, the server 10 includes a control unit 11, a storage unit 12, and a communication unit 13. The control unit 11 includes at least one processor. The control unit 11 is configured to execute processing in accordance with a program and data stored in the storage unit 12. The storage unit 12 includes a main memory unit and an auxiliary storage unit. For example, the main memory unit is a volatile memory, for example, a RAM, and the auxiliary storage unit is a non-volatile memory such as a ROM, an EEPROM, a flash memory, or a hard disk drive. The communication unit 13 includes a communication interface for wired communication or wireless communication, and communicates data via the network N.

The terminal 20 is a computer which can communicate to and from the server 10. For example, the terminal 20 is a personal computer, a portable information terminal (including a tablet computer and a wearable terminal), or a cellular phone (including a smartphone). For example, the terminal 20 includes a control unit 21, a storage unit 22, a communication unit 23, an operation unit 24, and a display unit 25. A physical configuration of each of the control unit 21, the storage unit 22, and the communication unit 23 may be the same as that of the control unit 11, the storage unit 12, and the communication unit 13, respectively. The operation unit 24 is an input device, and is, for example, a pointing device such as a touch panel or a mouse, a keyboard, or a button. The display unit 25 is, for example, a liquid crystal display unit or an organic EL display unit.

The programs and data described as being stored in the storages units 12 and 22 may be supplied through the network N. Moreover, the hardware configuration of each of the server 10 and the terminal 20 is not limited to the above-mentioned examples, and various types of hardware can be applied. For example, the server 10 and the terminal 20 may each include a reading unit (for example, optical disc drive or memory card slot) configured to read a computer-readable information storage medium and an input/output unit (for example, USB port) for inputting and outputting data to/from an external device. For example, programs and data stored in the information storage medium may be supplied to each computer through the reading unit or the input/output unit.

[1-2. Outline of Prediction System of First Embodiment]

The prediction system S of the first embodiment is configured to perform a prediction in order to obtain a desired result in a predetermined service while minimizing a cost. The prediction system S can perform predictions in any service. In the first embodiment, as an example, there is described a prediction in a service using IT. Application examples of other services are described in a second embodiment of the present disclosure and modification examples described later.

The service in the first embodiment is a service provided by using a computer. The user operates his or her own smartphone, for example, and uses the service via the network N. For example, the user uses a cloud service, an electronic payment service, a communication service, a financial service, an electronic commerce service, or a video distribution service.

The term "cost" refers to an expenditure incurred in the service. In the first embodiment, there is described a case in which the term "cost" means an amount of money per se, but the term "cost" may also correspond to other information having a correlation with an amount of money, for example, hardware performance. For example, as required hardware performance becomes higher, the amount of money required to prepare the hardware also increases, and therefore the hardware performance may correspond to the cost. Further, for example, as the number of required pieces of hardware becomes larger, the amount of money required to prepare that number of pieces of hardware also increases, and therefore the number of pieces of hardware may correspond to the cost.

The cost is incurred by the person or entity involved in the service. In the first embodiment, as an example, there is described a case in which the cost is incurred by a business entity providing the service, but the cost may be incurred by another person or entity depending on the contents of the service. For example, the cost may be incurred by a collaborator working with the business entity or by a user who is using the service.

The "desired result" is a result to be obtained in the service. In other words, the desired result is to achieve an objective, a task, or a mission in the service. For example, the desired result may be to maintain the quality of the service at or above a reference, to generate profit or sales at or above a reference, to secure the number of users at or above a predetermined number, to achieve an evaluation from users at or above a reference, to obtain an access number at or above a predetermined number, or to achieve a conversion rate of a predetermined value or more.

In the first embodiment, as an example, there is described a case in which satisfying a service level agreement in a cloud service corresponds to the desired result. The desired result may be any result corresponding to the contents of the service. Other examples of the desired result are described in the second embodiment and the modification examples described later. A service level agreement is an agreement on a quality reference of the service. For example, a quality reference of at least one of response speed, communication speed, uptime, the number of failures, and a recovery time is defined in the service level agreement.

In the first embodiment, a timeout occurrence rate is described as an example of the service level agreement. For example, a state in which a timeout occurrence rate is less than a predetermined percentage (for example, 3%) is defined as the service level agreement. That is, the state in which the timeout occurrence rate is less than the predetermined percentage corresponds to obtaining the desired result.

The prediction system S of the first embodiment predicts the system resource required to satisfy the service level agreement while suppressing the cost borne by the business entity of the cloud service. In the following description, the system for providing the cloud service is referred to as a "cloud system."

The user of the cloud service uses the functions of the cloud system from a remote location. For example, the user stores data on the cloud system or executes a program on the cloud system from a remote location. In the first embodiment, there is described a case in which the prediction system S is a system different from the cloud system, but the prediction system S may correspond to the cloud system.

The "resource" is a hardware resource included in the cloud system. For example, the resource is at least one of a server computer, a CPU, a memory, a communication device, and a communication line. The business entity providing the cloud service can select any resource. For example, the business entity can freely select the number of server computers, the CPU performance, and the memory capacity. The cost required for the cloud service also changes depending on the resource selected by the business entity.

In the cloud service, when the CPU performance is increased or the memory capacity is increased, the processing capacity of the cloud system increases, and therefore it becomes easier to satisfy the service level agreement. However, when the business entity excessively selects a resource, cost wastage occurs.

In view of this, the prediction system S predicts, for each resource candidate which can be selected by the business entity, whether or not the service level agreement is satisfied. Although the details are described later, the prediction system S performs the prediction in consideration of not only the hardware resource indicated by the candidate but also other elements, for example, a cloud system setting. However, in principle, the business entity can select resources but does not change other elements, for example, a setting. For that reason, in the first embodiment, in principle, only resource selection is involved in the determination regarding whether or not the business entity satisfies the service level agreement. Other elements, for example, a setting, may be changeable.

The prediction system S identifies a candidate having a relatively low cost among the candidates predicted to satisfy the service level agreement, and proposes the identified candidate to the business entity. For example, when the business entity operates the terminal 20 to access the server 10, a resource setting screen showing the prediction results of the server 10 is displayed on the display unit 25.

FIG. 2 is a diagram for illustrating an example of the resource setting screen. As illustrated in FIG. 2, on a resource setting screen G, for each resource candidate which can be selected by the business entity, the details of the hardware resource indicated by the candidate and the prediction result of the server 10 are displayed. In the example of FIG. 2, the business entity can select the performance of the CPU and the performance of the memory. The resource setting screen G may display detailed prediction results, for example, a predicted value of the timeout occurrence rate. Further, the resource setting screen G may display the cost corresponding to each candidate.

In the example of FIG. 2, six candidates are displayed by sorting each of the candidates in descending order of performance. For candidates "No. 1" to "No. 3," prediction results indicating that the service level agreement is satisfied are obtained. For candidates "No. 4" to "No. 6," prediction results indicating that the service level agreement is not satisfied are obtained. As a result, candidates "No. 3" and "No. 4" are the boundary of whether or not the service level agreement is satisfied.

On the resource setting screen G, an input form F for selecting any one of the six candidates is displayed. The business entity selects the candidate to be used in its own cloud service from the input form F with reference to the information displayed on the resource setting screen G.

In the example of FIG. 2, the candidate "No. 3" having the lowest cost among the candidates satisfying the service level agreement is selected by default in the input form F. The business entity may select the candidate "No. 3" having the lowest cost, or may select the candidate "No. 1" or "No. 2" to provide some leeway. In a case in which the service level agreement is to be reviewed, the business entity may select a candidate from "No. 4" and the subsequent candidates.

As described above, the prediction system S of the first embodiment predicts, for each selectable resource candidate, whether or not the business entity of the cloud service satisfies the service level agreement. The prediction result for each candidate is displayed on the resource setting screen G. As a result, the resource satisfying the service level agreement at the lowest cost in the cloud service can be set. The details of the prediction system S are now described.

[1-3. Functions to be Implemented in Prediction System of First Embodiment]

Figure 3:
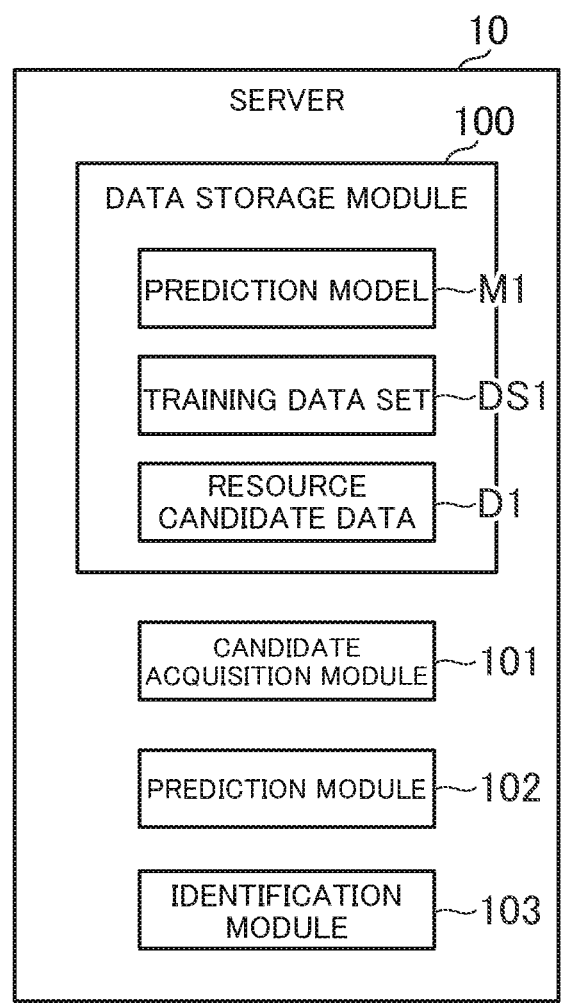
FIG. 3 is a functional block diagram for illustrating an example of functions to be implemented in a prediction system according to a first embodiment of the present disclosure.

FIG. 3 is a functional block diagram for illustrating an example of the functions to be implemented in the prediction system S of the first embodiment. In the first embodiment, there is described a case in which the main functions are implemented by the server 10. For example, the server 10 includes a data storage module 100, a candidate acquisition module 101, a prediction module 102, and an identification module 103. The data storage module 100 is mainly implemented by the storage unit 12. Each of the candidate acquisition module 101, the prediction module 102, and the identification module 103 is mainly implemented by the control unit 11.

[Data Storage Module]

The data storage module 100 is configured to store the data required for the server 10 to perform a prediction. In the first embodiment, a prediction model M1, a training data set DS1, and resource candidate data D1 are described as examples of this data.

The prediction model M1 is a model configured to output, when a resource candidate is input, a prediction result corresponding to the candidate. A relationship between the candidate and the prediction result is defined in the prediction model M1. The term "prediction model M1" may refer to the program itself which outputs the prediction result, or may refer to not only the program but also all of the data including parameters, for example.

In the first embodiment, the prediction model M1 is a learning model created by using machine learning. For the machine learning itself, various methods can be used. Examples of methods that can be used include a convolutional neural network and a recursive neural network. The term "prediction model M1" in the first embodiment does not mean the concept of machine learning, but means electronic data generated by the concept. That is, the prediction model M1 includes a program and parameters.

The processing contents (instructions or calculation expressions) to be executed by the computer are defined in the program included in the prediction model M1. For example, the prediction model M1 includes a code for calculating a feature amount corresponding to the input data. The parameters of the prediction model M1 include numerical values adjusted by learning. For example, the parameters of the prediction model M1 include numerical values such as a weighting coefficient and a bias. When the prediction model M1 has not yet been trained, the prediction model M1 includes parameters having initial values, and when the prediction model M1 has been trained, the prediction model M1 includes parameters adjusted by learning.

For example, the input data includes the resource candidates and at least one of a cloud system setting, a situation predicted for the cloud system, a setting of another system on which the cloud system depends, and a situation predicted for the another system. In the first embodiment, there is described a case in which all of those are included in the input data. The input data is not required to include all of those, as long as a value influencing the prediction result (value having a correlation with the prediction result) is included. For example, the input data may not include a cloud system setting, for example, and only include the values of the resources serving as candidates. The resource values are the performance of the hardware or the number of pieces of the hardware.

The cloud system setting is a setting value of a server computer, for example. For example, the cloud system setting is a keep-alive setting value or a timeout value. The cloud system setting influences the ease of satisfying the service level agreement. For example, as the keep-alive setting value or the timeout value becomes looser, the service level agreement is satisfied more easily.

The situation predicted for the cloud system is a predicted value, for example, a load on a resource of a server computer. For example, the situation may be the number of requests to the cloud system, the number of queries per second, or the amount of data. The situation predicted for the cloud system influences the ease of satisfying the service level agreement. For example, as the number of requests to the cloud system, number of queries per second, or amount of data becomes lower, the service level agreement is satisfied more easily.

The another system on which the cloud system depends is another system which works together with the cloud system, and is, for example, a database system. The setting of the another system is a setting value of a resource of the another system. For example, the setting of the another system is a setting value of a database, for example, the cache size. The setting of the another system influences the ease of satisfying the service level agreement. For example, as the database setting value, for example, the cache size, becomes larger, the service level agreement is satisfied more easily.

The situation predicted for the another system is a predicted value, for example, a load on the another system. For example, the situation may be the number of requests to the another system, the number of queries per second, or the amount of data. The situation predicted for the another system influences the ease of satisfying the service level agreement. For example, as the number of requests to the another system, number of queries per second, or amount of data becomes lower, the service level agreement is satisfied more easily.

FIG. 4 is a table for showing a data storage example of the training data set DS1. As shown in FIG. 4, the training data is an individual data unit to be learned by the prediction model M1. The term "training data" is sometimes referred to as "teacher data" or "learning data." For example, in the training data, input data having the same format as the data input into the prediction model M1 and output data (correct answer data) indicating the content to be output by the prediction model M1 when the input data is input are associated with each other. In the first embodiment, a pair of input data and output data is referred to as "training data," and a collection of pieces of training data is referred to as "training data set DS1."

The prediction model M1 in the first embodiment outputs, when information on, for example, a cloud service setting or resource is input, a prediction result of whether or not the service level agreement is satisfied. For that reason, as shown in FIG. 4, the input data included in the training data includes information on, for example, the cloud service setting or resource. The output data included in the training data includes a value indicating the prediction result.

For example, the output data is any one of a first value ("○" in FIG. 4) indicating that the service level agreement is satisfied and a second value ("x" in FIG. 4) indicating that the service level agreement is not satisfied. Those values may be expressed by a numerical value or by a character. Further, in place of showing the prediction result by using one of two values indicating whether or not the service level agreement is satisfied, the prediction result may be shown as a probability that the service level agreement is satisfied or as a predicted timeout value. The output data may be created based on actual measurement values obtained by testing various combinations of resources in an actual machine, or may be created by a simulator.

The training data set DS1 is prepared by the administrator of the prediction system S. The server 10 trains the prediction model M1 such that when the input data included in the individual training data of the training data set DS1 is input, the corresponding output data is output. For the learning itself, a known method used in machine learning can be used. Examples of learning methods that can be used include an error back propagation method used in a neural network.

FIG. 5 is a table for showing a data storage example of the resource candidate data D1. As shown in FIG. 5, the resource candidate data D1 is data showing the details of the resource candidates. For example, the resource candidate data D1 shows a relationship between the detailed contents (at least one of an amount and performance of a hardware resource) of the candidates and the required cost. For example, the resource candidate data D1 is prepared by the administrator of the prediction system S (for example, a cloud vendor).

In the first embodiment, the business entity selects the performance of the CPU and the performance of the memory, and therefore the performance of the CPU and the performance of the memory for each candidate are shown in the resource candidate data D1. The performance of the CPU and the performance of the memory are each expressed as a numerical value, and a higher numerical value indicates a higher performance. For example, in the case of the CPU, a higher numerical value for the clock frequency, cache, cores, and threads, for example, indicates a higher performance, and therefore the service level agreement can be satisfied more easily. Further, for example, in the case of the memory, a higher numerical value for a memory capacity and a memory clock (data transfer rate), for example, indicates a higher performance, and therefore the service level agreement can be satisfied more easily.

When the business entity can select the number of CPUs and the number of memories, the number of CPUs and the number of memories for each candidate are shown in the resource candidate data D1. For example, when there are a larger number of CPUs, the processing capacity is higher, and the service level agreement can be satisfied more easily. Further, for example, when there are a larger number of memories, the storage capacity is larger, and the service level agreement can be satisfied more easily. The same applies to a case in which the business entity can select another resource, and at least one of the performance and the number of the resource for each candidate may be shown in the resource candidate data D1.

As shown in FIG. 5, in the first embodiment, as the numerical value indicated by the candidate becomes higher, the cost becomes higher. For example, as the performance of the CPU or the memory becomes higher, the cost becomes higher. Further, for example, when there are a larger number of CPUs or memories, the cost becomes higher. The resource candidate data D1 may store the cost corresponding to the market price. Depending on the market price, there may be cases in which the cost of the resource is high despite the fact that the numerical value of the candidate is relatively low.

The data stored in the data storage module 100 is not limited to the example described above. For example, the data storage module 100 may store data indicating the contents of the service level agreement of the business entity. Further, for example, the data storage module 100 may store a setting value of the cloud system and a setting value of another system on which the cloud system depends. Moreover, for example, the data storage module 100 may store a program required for learning the prediction model M1.

[Candidate Acquisition Module]

The candidate acquisition module 101 is configured to acquire a plurality of candidates of information influencing the ease of obtaining the desired result in the predetermined service. The "ease of obtaining the desired result" is the probability or possibility of obtaining the desired result. As used herein, "influence" means that there is a correlation between the value indicated by the information and the ease with which the desired result can be obtained. For example, as the value indicated by the information becomes higher, the desired result is obtained more easily and the cost becomes higher. The value may be expressed as a numerical value or may be expressed as a character indicating the performance of the resource, for example. The candidate is a candidate value of the value indicated by the information, and can also be referred to as "option."

In the first embodiment, the above-mentioned information indicates the resources of the cloud system to be used in the cloud service. The information indicates the details of the resource, and indicates, for example, at least one of the performance of the hardware resource and the amount of the hardware resource. As the value indicated by the resource information becomes higher, the desired result is obtained more easily and the cost relating to the cloud service becomes higher.

In the first embodiment, the candidates are stored in the resource candidate data D1, and therefore the candidate acquisition module 101 acquires all or a part of the candidates stored in the resource candidate data D1. In place of storing the candidates in the resource candidate data D1, the candidates may be input from the operation unit 24 or may be generated by a program for generating the candidates.

[Prediction Module]

The prediction module 102 is configured to predict, for each candidate, based on a predetermined prediction method, whether or not the desired result is obtained. In the first embodiment, there is described a case in which the prediction method uses the trained prediction model M1, but the prediction method is not required to be a prediction method using machine learning. For example, the prediction method may use a simulator created for predicting whether or not the desired result is obtained. Moreover, for example, the prediction method may use a mathematical expression or a table in place of the prediction model M1 or a simulator. The prediction module 102 may perform the prediction based on data defining a relationship between the candidate and the prediction result of whether or not the desired result is obtained.

For example, for each candidate, the prediction module 102 predicts whether or not the service level agreement is satisfied by using the prediction model M1 trained based on training data in which the information indicating the resource is input and whether or not the desired result is obtained is output. The desired result in the first embodiment is not required to be satisfaction of the service level agreement, and may be satisfaction of a cloud-service-related reference defined separately from the service level agreement. In this case, the prediction module 102 predicts whether or not the reference relating to the cloud service is satisfied for each candidate.

For example, the prediction module 102 predicts whether or not the reference is satisfied based on at least one of the setting of the system used in the service, the situation predicted for the system, the setting of another system on which the system depends, and the situation predicted for the another system, and the candidate. The prediction module 102 inputs, for each candidate, input data including at least one of those and the candidate into the prediction model M1. The prediction model M1 calculates the feature amount of the input data, and outputs the prediction result corresponding to the feature amount. The prediction module 102 acquires the prediction result of each candidate output by the prediction model M1.

[Identification Module]

The identification module 103 is configured to identify candidates predicted to obtain the desired result. In the first embodiment, the identification module 103 identifies a candidate predicted to obtain the desired result and which has a relatively low cost. The expression "a relatively low cost" means a cost lower than other costs. In other words, the existence of at least one other higher cost corresponds to a relatively low cost.

In the first embodiment, the identification module 103 identifies the candidate having the lowest cost among the candidates predicted to obtain the desired result. For example, the identification module 103 identifies the boundary at which the prediction result changes from a prediction result that the service level agreement is satisfied to a prediction result that the service level agreement is not satisfied. The first candidate counting from that boundary corresponds to the candidate having the lowest cost. When the desired result is satisfaction of a reference relating to the cloud service as described above, the identification module 103 identifies candidates predicted to satisfy the reference relating to the cloud service.

The identification module 103 may identify, among the candidates obtaining a prediction result that the service level agreement is satisfied, the candidate having the second lowest cost or a candidate having a cost higher than the second lowest cost. Further, the identification module 103 may identify any candidate satisfying the service level agreement without considering the cost. The identification module 103 in the first embodiment displays the details of the identified candidate on the resource setting screen G, but the identified candidate may also be used for another purpose. For example, the identification module 103 may determine the identified candidate to be the resource of the business entity without causing the business entity to select the candidate.

[1-4. Processing to be Executed in Prediction System of First Embodiment]

Figure 6:
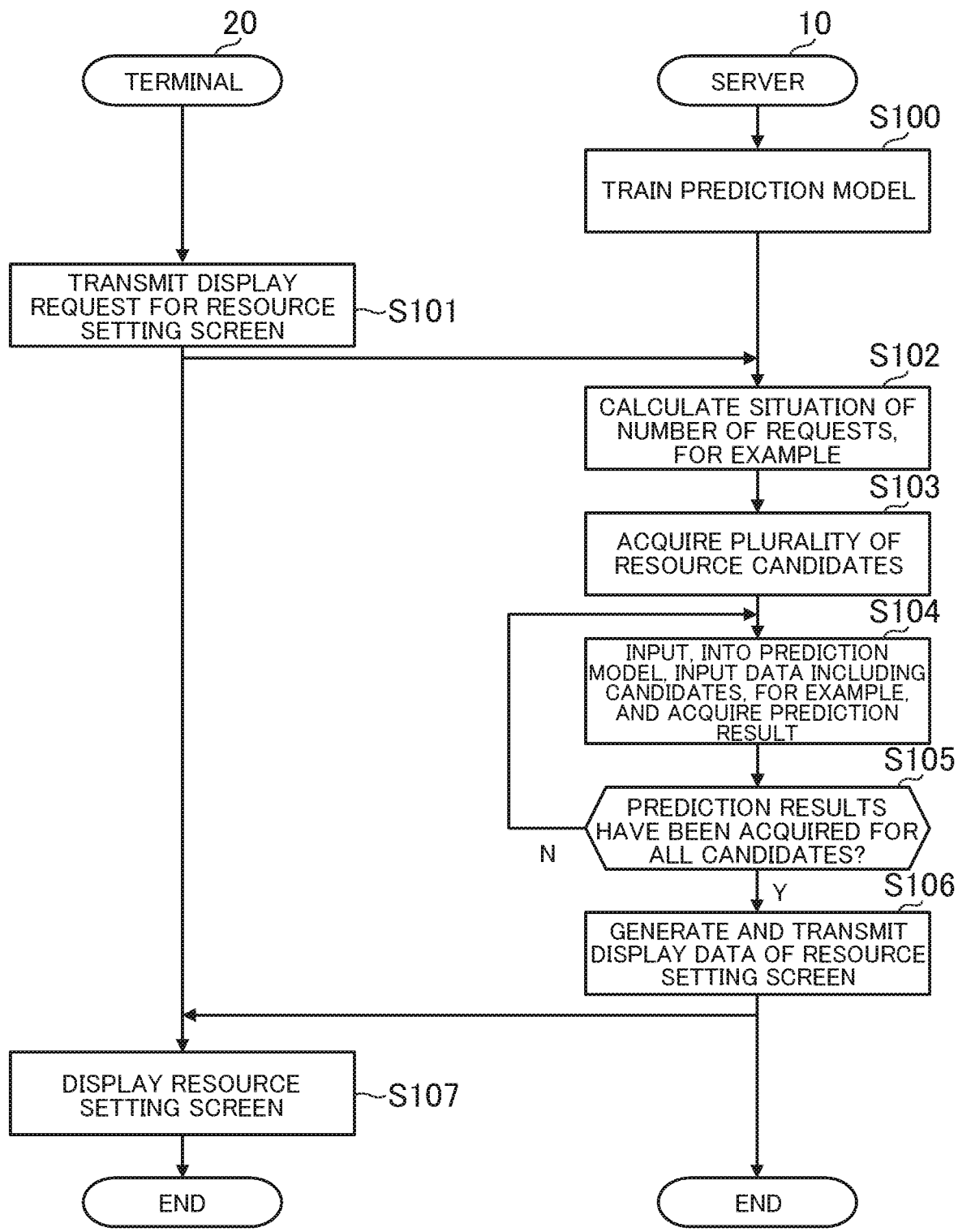
FIG. 6 is a flowchart for illustrating an example of processing to be executed in the prediction system of the first embodiment.

FIG. 6 is a flowchart for illustrating an example of processing to be executed in the prediction system S of the first embodiment. The processing illustrated in FIG. 6 is executed by the control unit 11 operating in accordance with programs stored in the storage unit 12 and the control unit 21 operating in accordance with programs stored in the storage unit 22. The processing described below is an example of processing to be executed by the functional blocks illustrated in FIG. 3.

As illustrated in FIG. 6, the server 10 trains the prediction model M1 based on the training data set DS1 (Step S100). In Step S100, the server 10 adjusts the parameters of the prediction model M1 based on the individual training data, and trains the prediction model M1. The server 10 records the trained prediction model M1 in the storage unit 12.

When a predetermined operation is performed from the operation unit 24, the terminal 20 transmits a display request for the resource setting screen G to the server 10 (Step S101). When the server 10 receives the display request, the server 10 calculates, for example, the situation of the number of requests predicted by the cloud system based on a predetermined calculation method (Step S102). In Step S102, the server 10 calculates, for example, the predicted value of the number of requests from statistics of the past measured values. The server 10 may calculate the predicted value at a predetermined date and time, or may calculate the predicted value every hour or monthly. In the first embodiment, in Step S102, the server 10 uses the same calculation method to also calculate the situation predicted for another system on which the cloud system depends.

The server 10 acquires a plurality of resource candidates based on the resource candidate data D1 (Step S103). In Step S103, the server 10 acquires all the candidates stored in the resource candidate data D1. In the first embodiment, the resource candidates may be acquired in descending order of cost, and the prediction may be performed by the processing of Step S104.

The server 10 inputs, into the prediction model M1, input data including the predicted value calculated in Step S102, the setting values of the cloud system and the another system stored in the storage unit 12, and any one of the candidates acquired in Step S103, and acquires the prediction result output from the prediction model M1 (Step S104). When the input data is input in Step S104, the prediction model M1 calculates a feature amount based on the input data, and outputs the prediction result corresponding to the feature amount.

The server 10 determines whether or not prediction results have been acquired for all the candidates acquired in Step S103 (Step S105). When there is a candidate for which a prediction result has not been acquired yet (Step S105: N), the processing returns to Step S104, and the prediction result of the next candidate is acquired.

In place of acquiring the prediction results of all the candidates, the server 10 may end the processing of acquiring the prediction results when a prediction result not satisfying the service level agreement is obtained. In this case, the prediction results are acquired in order from the candidate having the highest resource value which easily satisfies the service level agreement, for example, in descending order of cost. Contrary to that case, the server 10 may acquire the prediction results in order from the candidate having the lowest resource value and end the processing of acquiring the prediction results when a prediction result satisfying the service level agreement is obtained. That is, the server 10 may end the processing of acquiring the prediction results when the candidate that is the boundary of whether or not the service level agreement is satisfied is identified.

When it is determined that prediction results have been acquired for all the candidates (Step S105: Y), the server 10 generates the display data of the resource setting screen G and transmits the generated display data to the terminal 20 (Step S106). In Step S106, the server 10 generates display data of the resource setting screen G showing the relationship between the details of the candidates acquired in Step S103 and the prediction results acquired in Step S104. The server 10 sets the candidate having the lowest cost among the candidates predicted to satisfy the service level agreement as the default value of the input form F. The display data may be any data for displaying an image, for example, HTML data.

When the terminal 20 receives the display data, the terminal 20 displays the resource setting screen G on the display unit 25 (Step S107), and the processing ends. The business entity refers to the information displayed on the resource setting screen G, and determines the resource of the cloud system by selecting any candidate from the input form F.

According to the prediction system S of the first embodiment, a desired result is obtained more easily by predicting, for each candidate of information influencing the ease of obtaining the desired result in a predetermined service, whether or not the desired result is obtained and identifying the candidates predicted to obtain the desired result. For example, the prediction system S can increase the probability of obtaining the desired result by presenting the candidates predicted to obtain the desired result to a business entity or by determining those candidates as information to be used in the service.

Further, in the prediction system S, as the value indicated by the information becomes higher, the desired result is obtained more easily and the cost relating to the service becomes higher. The prediction system S identifies a candidate which is predicted to obtain the desired result and which has a relatively low cost. As a result, the prediction system S can obtain the desired result while suppressing the cost. For example, waste of the hardware resource required to satisfy the service level agreement can be suppressed. For example, it is possible to suppress the installation of an excessively high-performance CPU or a wastefully large memory.

Further, the prediction system S can minimize the cost for obtaining the desired result by identifying the candidate having the lowest cost among the candidates predicted to obtain the desired result. For example, the service level agreement can be satisfied by using the minimum hardware resource. For example, through installation of a CPU having the minimum performance or installation of a memory having the minimum capacity, waste of hardware resources can be effectively suppressed.

Further, the prediction system S can increase a prediction accuracy of whether or not the desired result is obtained by using the prediction model M1 to predict, for each candidate, whether or not the result is obtained. Moreover, the latest trends can be reflected in the prediction result by periodically training the prediction model M1 based on the latest training data.

Further, the prediction system S can identify a resource required in order to satisfy a reference of the service level agreement, for example, and can secure the resource in order to provide a service having a certain quality level. As a result, the quality of the service can be improved.

Further, the prediction system S can increase the prediction accuracy by predicting whether or not the reference of the service level agreement, for example, is satisfied based on at least one of the setting of the system used in the service, the situation predicted for the system, the setting of another system on which the system depends, and the situation predicted for the another system, and the candidate.

2. Second Embodiment

In the first embodiment, there is described a case in which the prediction system S is applied to a cloud service, but in a second embodiment of the present disclosure, there is described a case in which the prediction system S is applied to an electronic payment service. In the second embodiment, description of parts which are the same as those in the first embodiment is omitted, and the parts different from those in the first embodiment are described.

The server 10 in the second embodiment is a server computer configured to provide an electronic payment service. For the electronic payment itself, a known payment method can be used. Examples of the payment method include payment using a credit card, electronic money, points, a bank account, and virtual currency. The server 10 stores information required for the electronic payment and executes payment processing in response to a request from the user.

The terminal 20 is a computer to be operated by the user of the electronic payment service. For example, an electronic payment service application (hereinafter referred to as an "electronic payment application") is installed on the terminal 20. The user uses the electronic payment application of the terminal 20 to perform electronic payment at a physical store or a vending machine, for example. The terminal 20 may include an IC chip for electronic payment.

In the second embodiment, when the user performs electronic payment by using the electronic payment service, points that can be used from the next time onward are conferred. The points may be conferred at any time. For example, the points may be conferred each time the user performs electronic payment, or may be conferred at regular intervals. The profit of the business entity of the electronic payment service is reduced by the amount of points conferred to the user, and therefore the cost of the points is incurred by the business entity.

The business entity can motivate users to continue using the electronic payment service by bearing a cost burden corresponding to the points. When a business entity confers many points to all users, the business entity can strongly motivate all the users, but the business entity incurs a very large cost. Moreover, the effective amount of points to provide motivation is different depending on the user. For that reason, even when all of the users are uniformly conferred with the same amount of points, that does not mean all the users are effectively motivated.

In view of this, the prediction system S of the second embodiment predicts, for each candidate of points to be conferred, whether or not the user continues to use the electronic payment service based on the assumption that the points are conferred. As a result, an effective amount of points to provide motivation is conferred to the user. Further, among the candidates of points for which it is predicted that the user continues to use the electronic payment service, the prediction system S identifies the candidate having the minimum value as the points to be conferred to the user. As a result, the costs incurred by the business entity are minimized.

Figure 7:
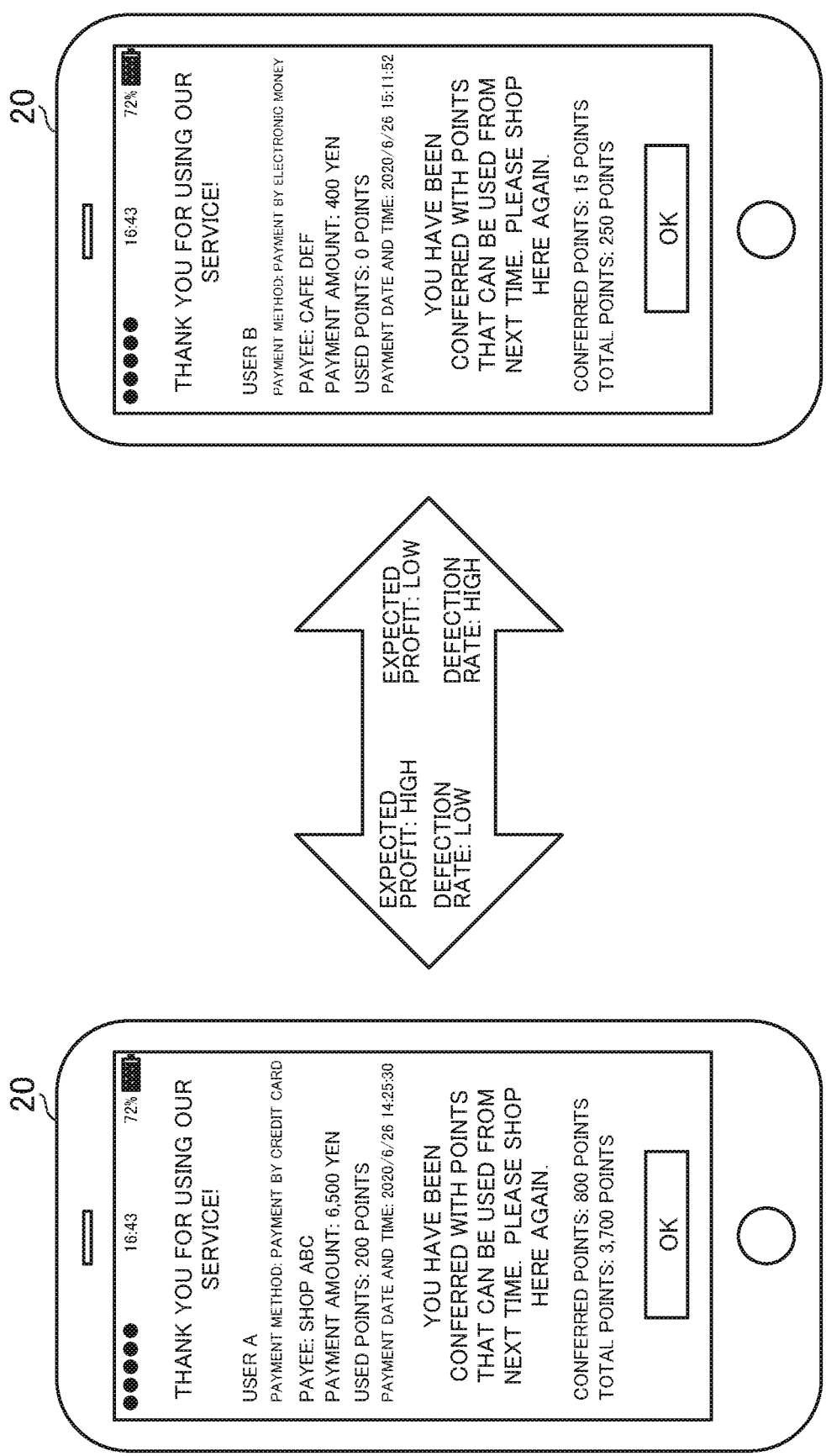
FIG. 7 is a diagram for illustrating an outline of a prediction system according to a second embodiment of the present disclosure.

FIG. 7 is a diagram for illustrating an outline of the prediction system S according to the second embodiment. In the example of FIG. 7, there is illustrated a case in which points are conferred to each of a user A having a high expected profit and a low defection rate and a user B having a low expected profit and a high defection rate. The expected profit is the profit predicted (expected) to be obtained from the user in a predetermined period in the future. The defection rate is a probability that the user is predicted to defect from the electronic payment service, or a ratio of a period during which the user is predicted to defect among a certain period (for example, 6 months). The details are described later, but the expected profit and the defection rate are each calculated based on, for example, a user attribute and a usage situation.

Continuing to use the electronic payment service and not defecting from the electronic payment service may have the same meaning as each other, but in the second embodiment, those actions have a different meaning from each other. In the second embodiment, when the user does not use the electronic payment service for a certain period t1 (for example, t1 is one month), the user is set to be in a state of having defected from the electronic payment service. A user who does not satisfy the defection condition is set to be in a state of not having defected from the electronic payment service.

The user is set to be in a state of not continuing to use the electronic payment service when the number of times the user has defected during a period t2, which is a period longer than the period t1 (for example, t2 is 6 months), is equal to or more than a predetermined number of times, or when the period in which the user has not used the electronic payment service even once exceeds a reference value. A user satisfying the continuation condition is set to be in a state of continuing to use the electronic payment service. In the second embodiment, a state in which the user does not continue to use the electronic payment service may be referred to as a "dormant" state. Even in the case of a user who has defected, when the number of defections is small or the period of not using the electronic payment service even once is short, the continuation condition may be satisfied.

The user A has a high expected profit and a low defection rate, and therefore the prediction system S predicts that even when the many points are conferred to the user A, no loss is incurred by the business entity. Accordingly, the prediction system S confers "800 points" to the user A, which is a larger number of points than to the user B. "800 points" is the minimum value of points predicted to be effective in motivating the user A. Further, the prediction system S predicts that a profit is obtained even when "800 points" is conferred to the user A.

The user B has a low expected profit and a high defection rate, and therefore the prediction system S predicts that conferring many points to the user B results in a loss for the business entity. Accordingly, the prediction system S confers "15 points" to the user B, which is a lower number of points than to the user A. "15 points" is the minimum value of points predicted to be effective in motivating the user B. Further, the prediction system S predicts that a profit is obtained even when "15 points" is conferred to the user B.

As described above, the prediction system S of the second embodiment confers to the user the amount of points predicted to motivate the user to continue using the electronic payment service within a range in which the business entity is profitable. The details of the prediction system S of the second embodiment are now described.

[2-1. Functions to be Implemented in Prediction System of Second Embodiment]

Figure 8:
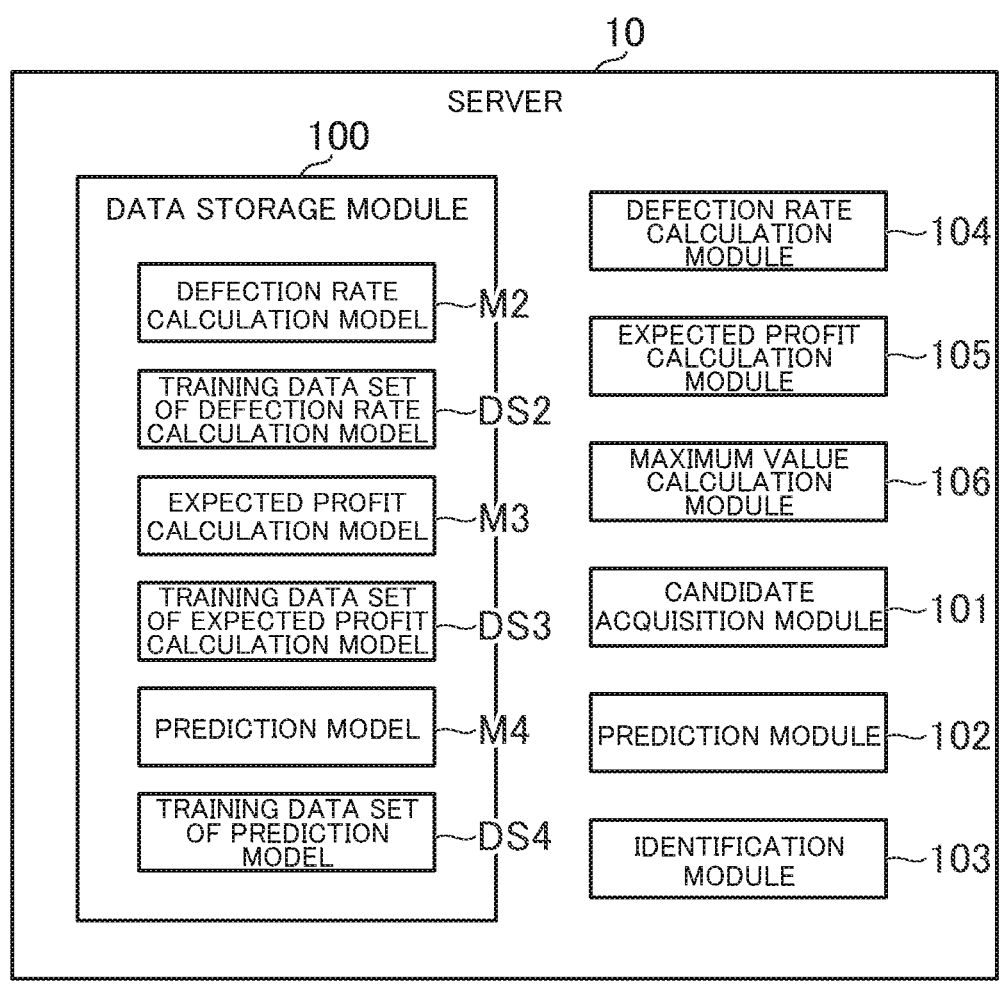
FIG. 8 is a functional block diagram for illustrating an example of functions to be implemented in the prediction system of the second embodiment.

FIG. 8 is a functional block diagram for illustrating an example of the functions to be implemented in the prediction system S of the second embodiment. The server 10 in the second embodiment includes, in addition to the functions described in the first embodiment, a defection rate calculation module 104, an expected profit calculation module 105, and a maximum value calculation module 106. Each of the defection rate calculation module 104, the expected profit calculation module 105, and the maximum value calculation module 106 is mainly implemented by the control unit 11. Regarding the data storage module 100, the candidate acquisition module 101, the prediction module 102, and the identification module 103 described in the first embodiment, parts which are different from the first embodiment are described here.

[Data Storage Module]

In the second embodiment, as an example of the data stored in the data storage module 100, a defection rate calculation model M2, an expected profit calculation model M3, a prediction model M4, and training data sets DS2 to DS4 corresponding to the respective models are stored.

The defection rate calculation model M2 is configured to calculate and output the defection rate of a user when information on the user is input. A relationship between the information on the user and the defection rate is defined in the defection rate calculation model M2. The term "defection rate calculation model M2" may refer to the program itself which calculates and outputs the defection rate, or may refer to not only the program but also all of the data including parameters, for example.

In the second embodiment, the defection rate calculation model M2 is a model created by using machine learning. Similarly to the prediction model M1 described in the first embodiment, various methods can be used for the machine learning itself. Further, like the prediction model M1 described in the first embodiment, the defection rate calculation model M2 includes at least one of a program and parameters, and the parameters are adjusted by learning. Those matters are the same for the expected profit calculation model M3 and the prediction model M4 in the second embodiment.

In the second embodiment, the input data of the defection rate calculation model M2 includes at least one of a user attribute, a usage situation of the electronic payment service, and a usage situation of another service. The attribute is information representing a feature of the user, and can also be referred to as "classification" or "category". For example, the attribute is at least one of a gender, age, residential area, income (annual income), and occupation of the user. The attribute is a kind of personal information on the user.

The usage situation of the electronic payment service is information indicating how the user has used the electronic payment service in all periods or a part of a period in the past (for example, the last month). For example, the usage situation of the electronic payment service is at least one of the amount of money used, the number of points used, the number of times of use, the frequency of use, the time of use, the place of use, and the payee in the electronic payment service.

The another service is another service used by users of the electronic payment service. The electronic payment service is linked with the another service and shares the usage situation of the user with the another service. For example, the another service is a financial service, a telecommunications service, or an electronic commerce service affiliated with the electronic payment service. The usage situation in the another service is information indicating how a user has used the another service in all periods or a part of a period in the past. For example, the usage situation of the another service is at least one of the amount of money used, the number of points used, the number of times of use, the frequency of use, the time of use, the place of use, and the payee in the another service.

FIG. 9 is a table for showing a data storage example of the training data set DS2 of the defection rate calculation model M2. As shown in FIG. 9, the training data set DS2 of the defection rate calculation model M2 stores many pieces of training data, each of which is a pair of input data including the user attribute, the usage situation of the electronic payment service by the user, and the usage situation of the another service by the user, and output data indicating a defection rate.

The training data set DS2 is prepared by the administrator of the prediction system S. The defection rate is aggregated based on the usage situations of users in the past. The output data is not required to be the defection rate, and may be a value indicating whether or not the user has defected. In this case, the defection rate calculation model M2 may output a score indicating a probability of defection as the defection rate.

The expected profit calculation model M3 calculates and outputs the expected profit of a user when information on the user is input. A relationship between the information on the user and the expected profit is defined in the expected profit calculation model M3. The term "expected profit calculation model M3" may refer to the program itself which calculates and outputs the expected profit, or may refer to not only the program but also all of the data including parameters, for example.

In the second embodiment, the expected profit calculation model M3 is a model created by using machine learning. The input data of the expected profit calculation model M3 includes at least one of the attribute of the user and the usage situation of the electronic payment service by the user. The input data may include the usage situation of another service by the user. Further, the period indicated by the usage situation of the electronic payment service may be the same period as that for the defection rate calculation model M2, or may be a different period from that for the defection rate calculation model M2. For example, the period indicated by the usage situation of the electronic payment service may be a longer period than that for the defection rate calculation model M2. For example, the defection rate calculation model M2 may use only the most recent usage situation, and the expected profit calculation model M3 may use a usage situation of a longer period.

FIG. 10 is a table for showing a data storage example of the training data set DS3 of the expected profit calculation model M3. As shown in FIG. 10, the training data set DS3 of the expected profit calculation model M3 stores many pieces of training data, each of which is a pair of input data including the user attribute and the usage situation of the electronic payment service and output data indicating the expected profit. The training data set DS3 is prepared by the administrator of the prediction system S. The expected profit is aggregated based on the usage situations of users in the past.

The prediction model M4 in the second embodiment is the same as the first embodiment in terms of predicting whether or not a desired result is obtained. However, the meaning of the desired result in the second embodiment is different from that in the first embodiment, and therefore the details of the processing of the prediction model M4 are different from the first embodiment. The prediction model M4 in the second embodiment is configured to output, when the information on the user is input, a prediction result of whether or not the user continues to use the electronic payment service.

A relationship between the information on the user and the prediction result of continued usage is defined in the prediction model M4. The term "prediction model M4" may refer to the program itself which calculates and outputs the prediction result, or may refer to not only the program but also all of the data including parameters, for example.

The prediction model M4 in the second embodiment is a model created by using machine learning. The input data of the prediction calculation model includes at least one of the defection rate of the user, the attribute of the user, the usage situation of the electronic payment service by the user, and the usage situation of another service by the user. The period indicated by those usage situations may be the same as the period for the defection rate calculation model M2 and the expected profit calculation model M3, or may be a different period from that for the defection rate calculation model M2 and the expected profit calculation model M3. For example, for the prediction model M4, only the most recent usage situation may be used. In the second embodiment, in addition to the above-mentioned information, the number of points actually conferred by the user is included in the input data.

FIG. 11 is a table for showing a data storage example of the training data set DS4 of the prediction model M4. As shown in FIG. 11, the training data set DS4 of the prediction model M4 stores many pieces of training data, each of which is a pair of input data including the defection rate, the user attribute, the usage situation of the electronic payment service, and the conferred points, and output data indicating the prediction result.

The training data set DS4 is prepared by the administrator of the prediction system S. The value indicated by the output data (continuation or dormant) is aggregated based on the usage situations of users in the past. For example, for the data collection of the training data set DS4, points may be randomly conferred to a certain ratio of users in advance, and whether or not the users conferred with the points continued to use the electronic payment service may be confirmed.

The data stored in the data storage module 100 is not limited to the examples described above. For example, the data storage module 100 may store a user database in which various types of information about the user are stored. The user database stores authentication information, for example, a user ID and a password, payment information, for example, credit card information, the attribute of the user, points held by the user, a history of the points conferred in the past, usage situations in the electronic payment service, and usage situations in another service.

[Defection Rate Calculation Module]

The defection rate calculation module 104 is configured to calculate the defection rate of the user from the electronic payment service based on a predetermined calculation method. In this embodiment, as an example of the calculation method, there is described an example of a method using the defection rate calculation model M2. The calculation method may be another method, for example, a calculation method using a macro, a mathematical expression, a table, or the like. The defection rate calculation module 104 may calculate a defection rate corresponding to the user based on some kind of data in which a relationship between information on the user and the defection rate is defined.

For example, as the annual income of the user becomes higher, the defection rate of the user becomes lower. Further, for example, as the residential area of the user becomes more urban, the defection rate of the user becomes lower. Moreover, for example, as the amount of money used by the user becomes larger, the defection rate of the user becomes lower. In addition, for example, as the frequency of use by the user becomes higher, the defection rate of the user becomes lower. Further, for example, as the number of places used by the user becomes higher, the defection rate of the user becomes lower. Other elements similarly have a correlation between the information on the user and the defection rate, and the defection rate corresponding to the user may be calculated based on the data defining the correlation.

In the second embodiment, the defection rate calculation module 104 is configured to calculate the defection rate based on at least one of the attribute of the user, the usage situation of the electronic payment service by the user, and the usage situation of another service by the user. The defection rate calculation module 104 inputs, into the defection rate calculation model M2, input data including at least one of those items. The defection rate calculation model M2 calculates a feature amount of the input data, and outputs the defection rate corresponding to the feature amount. The defection rate calculation module 104 acquires the defection rate output by the defection rate calculation model M2. The defection rate calculation model M2 may output the defection rate in consideration of a history of conferring points in the past.

[Expected Profit Calculation Module]

The expected profit calculation module 105 is configured to calculate the expected profit of the user based on a predetermined calculation method. In this embodiment, as an example of the calculation method, there is described an example of a method using the expected profit calculation model M3. The calculation method may be another method, for example, a calculation method using a macro, a mathematical expression, a table, or the like. The expected profit calculation module 105 may calculate an expected profit corresponding to the user based on some kind of data in which a relationship between information on the user and the expected profit is defined.

For example, as the annual income of the user becomes higher, the expected profit of the user becomes higher. Further, for example, as the residential area of the user becomes more urban, the expected profit of the user becomes higher. Moreover, for example, as the amount of money used by the user becomes larger, the expected profit of the user becomes higher. In addition, for example, as the frequency of use by the user becomes higher, the expected profit of the user becomes higher. Further, for example, as the number of places used by the user becomes higher, the expected profit of the user becomes higher. Other elements similarly have a correlation between the information on the user and the expected profit, and the expected profit corresponding to the user may be calculated based on the data defining the correlation.

In the second embodiment, the expected profit calculation module 105 is configured to calculate the expected profit based on at least one of the attribute of the user and the usage situation of the electronic payment service by the user. The expected profit calculation module 105 inputs, into the expected profit calculation model M3, input data including at least one of those items. The expected profit calculation model M3 calculates a feature amount of the input data, and outputs the expected profit corresponding to the feature amount. The expected profit calculation module 105 acquires the expected profit output by the expected profit calculation model M3.

[Maximum Value Calculation Module]

The maximum value calculation module 106 is configured to calculate the maximum value of points conferrable to the user. In the second embodiment, the maximum value calculation module 106 calculates the maximum value of points conferrable to the user based not only on the defection rate but also on the expected profit. The maximum value calculation module 106 may also calculate the maximum value of conferrable points by considering only the defection rate without considering the expected profit.

The maximum value calculation module 106 may calculate the maximum value of conferrable points based on a predetermined calculation method. The calculation method may be any method. Examples of methods that can be used include a method of calculating the maximum value based on a model created by using machine learning, a method using a predetermined calculation expression, or a table in which conferrable points are defined.

For example, the maximum value calculation module 106 calculates the maximum value such that as the defection rate becomes lower, the maximum value of the conferrable points becomes higher. Further, for example, the maximum value calculation module 106 calculates the maximum value such that as the expected profit becomes higher, the maximum value of the conferrable points becomes higher. In the second embodiment, the following method is described as an example of the calculation method of the maximum value, but the calculation method is not limited to that method. For example, in order to retain users having a high defection rate, the maximum value calculation module 106 may calculate the maximum value such that as the defection rate becomes higher, the maximum value of the conferrable points becomes higher.

For example, when the defection rate of the user is represented by $P(c)$, the expected profit of the user is represented by $R(c)$, and the points corresponding to the defection rate $P(c)$ are represented by $f(P(c))$, in a case in which the user defects from the electronic payment service, the business entity bears the full amount of the conferred points, resulting in a loss of "$f(P(c))$". When the user continues to use the electronic payment service without defecting, it is predicted that a profit of "$R(c)-f(P(c))$" is generated.

For the business entity, the value obtained by the calculation expression "$(1-P(c))\times(R(c)-f(P(c)))-P(c)\times f(P(c))$" is the expected profit obtained by the business entity. The maximum value calculation module 106 calculates the maximum value of the points $f(P(c))$ such that this value becomes positive. For example, the maximum value calculation module 106 calculates the maximum value of the conferrable points $f(P(c))$ such that the calculation expression "$f(P(c))<R(c)-P(c)\times R(c)$" or "$f(P(c))\leq R(c)-P(c)\times R(c)$" is satisfied.

[Candidate Acquisition Module]

The prediction model M4 in the second embodiment is the same as the prediction model M1 in the first embodiment in terms of acquiring candidates of information influencing the ease of obtaining the desired result. In the second embodiment, the information is the points to be conferred to the user of the electronic payment service, and therefore the candidate acquisition module 10 acquires candidates of the points to be conferred to the user. In the second embodiment, the desired result is continued usage of the electronic payment service by the user, and the points correspond to an example of information influencing whether the electronic payment service continues to be used. As the number of points conferred to the user becomes higher, the user is more likely to continue to use the electronic payment service.

The points are an example of a privilege. The privilege is not limited to points, and any privilege may be conferred to the user. For example, a discount or a coupon which can be used at that location, or a present to the user, may correspond to the privilege. For example, the candidate acquisition module 101 acquires candidates within the range of the maximum value calculated by the maximum value calculation module 106. The range of the maximum value is any numerical value equal to or less than the maximum value.

In the second embodiment, there is described a case in which the candidate acquisition module 101 acquires all of the numerical values equal to or less than the maximum value as the candidates, but the candidate acquisition module 101 may acquire only a part of the numerical values equal to or less than the maximum value. The candidate acquisition module 101 may also acquire randomly generated numerical values as the candidates regardless of the maximum value.

[Prediction Module]

The prediction module 102 is configured to predict whether or not the user continues to use the electronic payment service. In the second embodiment, description is given of a prediction method which uses the trained prediction model M4, but it is not particularly required that the prediction be performed by using machine learning. For example, the prediction method may use a simulator created for predicting whether or not usage continues. Moreover, for example, the prediction method may use a mathematical expression or a table in place of the prediction model M4 or a simulator.

The prediction module 102 predicts whether or not the user continues to use the electronic payment service based on at least one of the defection rate of the user from the electronic payment service, an attribute of the user, a usage situation of the service by the user, and a usage situation of another service by the user. The prediction module 102 inputs, for each candidate, input data including at least one of those and the candidate into the prediction model M4. The prediction model M4 calculates the feature amount of the input data, and outputs the prediction result corresponding to the feature amount. The prediction module 102 acquires the prediction result for each candidate output by the prediction model M4.

[Identification Module]

The identification module 103 is configured to identify candidates for which it is predicted that the user continues to use the electronic payment service. In the second embodiment, consideration is also given to the maximum value of the conferrable points, and therefore the identification module 103 identifies, within the range of the maximum value, candidates for which it is predicted that the user continues to use the electronic payment service. Further, in the second embodiment, consideration is also given to the expected profit, and therefore the identification module 103 identifies, based on the expected profit, candidates for which it is predicted that the user continues to use the electronic payment service. For example, the identification module 103 identifies, within the range of a maximum value corresponding to the expected profit, candidates for which it is predicted that the user continues to use the electronic payment service.

FIG. 12 is a table for showing processing contents of the identification module 103 in the second embodiment. The data indicated by the reference symbol D2 in FIG. 12 is data in which the prediction result of the user having the user ID "u00001" is stored. The prediction module 102 stores the prediction result in the data D2 in association with the point candidates each time a prediction result is obtained from the prediction model M4. In the example of FIG. 12, the maximum value of the conferrable points is "1,000 points." The identification module 103 refers to the prediction result of the prediction module 102 for all of the candidates equal to or less than "1,000" points.

In the example of FIG. 12, when the number of points is "800 points" or more, a prediction result of "continue" is obtained, and when the number of points is "799 points" or less, a prediction result of "dormant" is obtained. Consequently, the identification module 103 identifies a minimum value of "800 points" obtained by the prediction result of "continue" as the points to be conferred to the user. The identification module 103 may identify "801 points" or more, or may even identify "799 points," which is close to the boundary between "continue" and "dormant". The identification module 103 confers the identified points to the user. Conferral of points means that the points held by the user is increased. In the example of FIG. 12, prediction results are obtained for candidates at intervals of one point below the maximum number of conferrable points, but the units of the points for obtaining a prediction result may also be any other unit.

Points are not required to be conferred each time the user uses the service, and the conferral of points may be restricted such that points are not conferred for a predetermined period after points have been conferred. Further, in a case in which, regardless of how many points are conferred, the business entity does not obtain a profit and the user does not continue to use the electronic payment service, points may not be conferred. For example, when a prediction result of "dormant" is obtained for all of the candidates at or below the maximum value of the conferrable points, points may not be conferred.

[2-2. Processing to be Executed in Prediction System of Second Embodiment]

Figure 13:
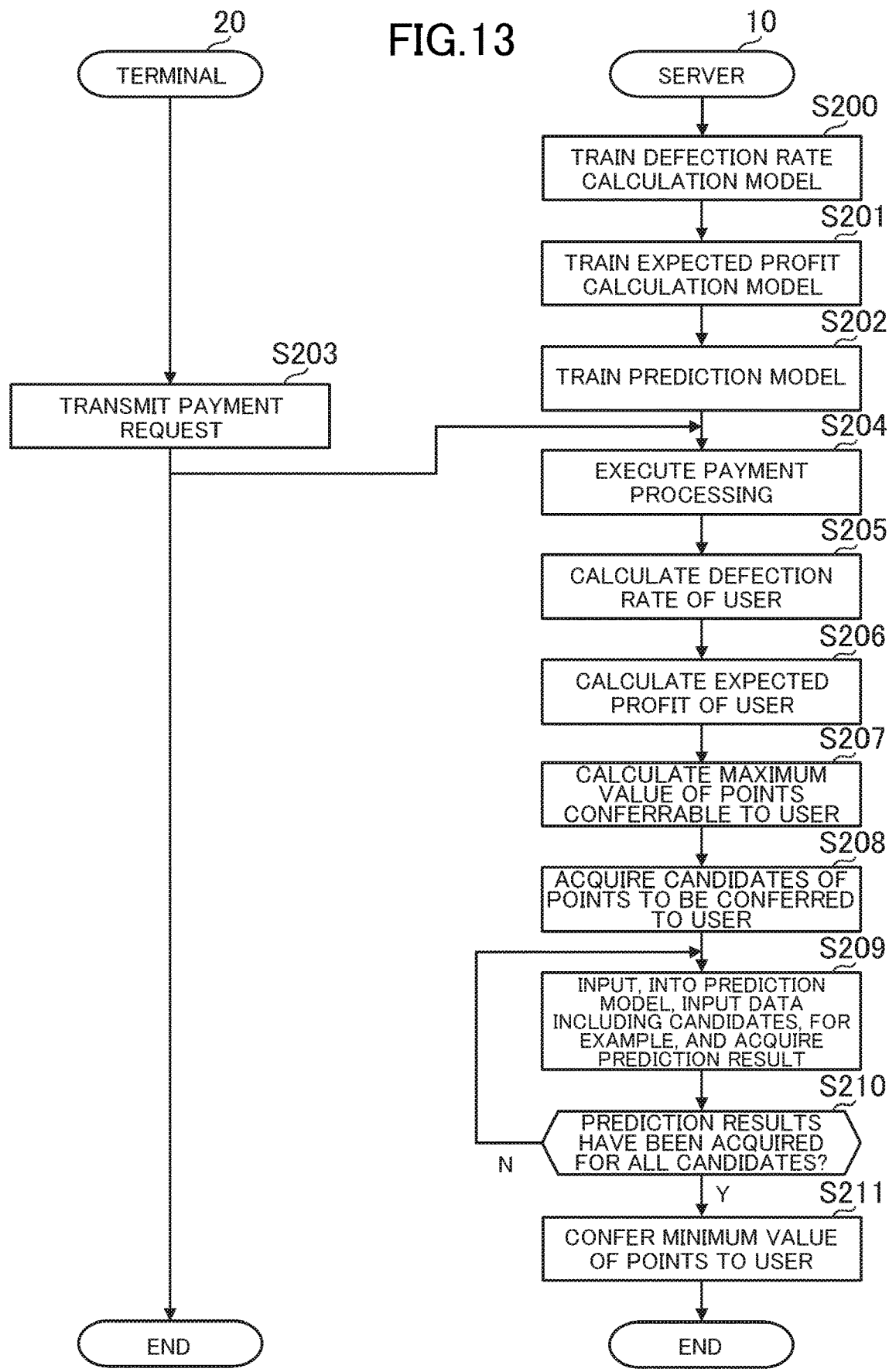
FIG. 13 is a flowchart for illustrating an example of processing to be executed in the prediction system of the second embodiment.

FIG. 13 is a flowchart for illustrating an example of processing to be executed in the prediction system S of the second embodiment. The processing illustrated in FIG. 13 is executed by the control unit 11 operating in accordance with programs stored in the storage unit 12 and the control unit 21 operating in accordance with programs stored in the storage unit 22. The processing described below is an example of processing to be executed by the functional blocks illustrated in FIG. 8.

As illustrated in FIG. 13, the server 10 trains the defection rate calculation model M2 based on the training data set DS2 of the defection rate calculation model M2 (Step S200). In Step S200, the server 10 adjusts the parameters of the defection rate calculation model M2 such that the output data included in the training data is obtained when the input data included in the training data is input to the defection rate calculation model M2. Similarly to the prediction model M1 in the first embodiment, for the learning itself, a known method used in machine learning can be used. This point is the same for the expected profit calculation model M3 and the prediction model M4 in the second embodiment.

The server 10 trains the expected profit calculation model M3 based on the training data set DS3 of the expected profit calculation model M3 (Step S201). In Step S201, the server 10 adjusts the parameters of the expected profit calculation model M3 such that the output data included in the training data is obtained when the input data included in the training data is input to the expected profit calculation model M3.

The server 10 trains the prediction model M4 based on the training data set DS4 of the prediction model M4 (Step S202). In Step S202, the server 10 adjusts the parameters of the prediction model M4 such that the output data included in the training data is obtained when the input data included in the training data is input to the prediction model M4.

When a predetermined operation is performed from the operation unit 24, the terminal 20 transmits a payment request to the server 10 (Step S203). The payment request is a request for requesting execution of payment processing. For example, the payment request includes information on a payment method selected by the user in the electronic payment service and a payment amount. When the server 10 receives the payment request, the server 10 executes payment processing (Step S204). The server 10 updates the usage situation of the electronic payment service by the user based on the execution result of the payment processing in Step S204.

The server 10 calculates the defection rate of the user based on the trained defection rate calculation model M2 (Step S205). In Step S205, the server 10 inputs, into the defection rate calculation model M2, input data including at least one of the attribute of the user, the usage situation of the electronic payment service by the user, and the usage situation of another service by the user. The defection rate calculation model M2 calculates the feature amount of the input data, and outputs the defection rate corresponding to the feature amount.

The server 10 calculates the expected profit of the user based on the trained expected profit calculation model M3 (Step S206). In Step S206, the server 10 inputs, into the expected profit calculation model M3, input data including at least one of the attribute of the user and the usage situation of the electronic payment service by the user. The expected profit calculation model M3 calculates the feature amount of the input data, and outputs the expected profit corresponding to the feature amount.

The server 10 calculates the maximum value of points conferrable to the user based on the expected profit calculated in Step S206 (Step S207). In Step S207, the server 10 puts the defection rate calculated in Step S205 and the expected profit calculated in Step S206 into a predetermined calculation expression to calculate the maximum value of the points.

The server 10 acquires candidates of the points to be conferred to the user within the range of the maximum value calculated in Step S207 (Step S208). In Step S208, the server 10 acquires all the numerical values equal to or less than the maximum value calculated in Step S207 as the point candidates. The processing of Step S209 described below is executed in descending order of the numerical value indicated by the candidates.

The server 10 acquires, for each candidate acquired in Step S208, based on the trained prediction model M4, the prediction result of whether or not the user continues to use the electronic payment service (Step S209). In Step S209, the server 10 inputs, into the prediction model M4, input data including the candidates acquired in S208 and at least one of the defection rate calculated in Step S205, the attribute of the user, the usage situation of the electronic payment service by the user, and the usage situation of another service by the user, and acquires the prediction result output from the prediction model M4. The prediction model M4 calculates a feature amount based on the input data, and outputs the prediction result corresponding to the feature amount.

The server 10 determines whether or not prediction results have been acquired for all the candidates acquired in Step S208 (Step S210). When there is a candidate for which a prediction result has not been acquired yet (Step S210: N), the processing returns to Step S209, and the prediction result of the candidate having the next lowest numerical value is acquired.

When it is determined that prediction results have been acquired for all the candidates (Step S210: Y), the server 10 confers to the user the minimum value of points among the candidates having a prediction result indicating continuation (Step S211), and the processing ends. When the points are conferred to the user, the server 10 transmits a notification that payment has been completed to the terminal 20, and the screen of FIG. 7 is displayed on the terminal 20. The processing of Step S203 and Step S204 may be omitted. For example, a terminal 20 of a user having a high defection rate has a low payment request transmission frequency, and therefore in place of conferring points in response to transmission of a payment request, the points may be conferred at another timing. With the configuration described above, it is possible to prevent missing out on an opportunity to motivate users having a high defection rate to continue the electronic payment service. Such a user may be notified that the points have been conferred by using electronic mail, for example. That is, the user may be made aware of the fact that points have been conferred without the user activating the electronic payment application.

According to the prediction system S of the second embodiment, the probability of a user continuing to use a service in which points can be used, like an electronic payment service, for example, is increased. As a result, the profit obtained by the business entity can be maximized.

Further, the prediction system S of the second embodiment can cause, within a range in which the business entity can reliably obtain a profit, the user to continue to use the service by identifying candidates for which it is predicted that the user continues to use the electronic payment service, within the range of a maximum value of points corresponding to the defection rate of the user.

Further, the prediction system S of the second embodiment can increase the calculation accuracy of the defection rate by calculating the defection rate based on at least one of an attribute of the user, a usage situation of the service by the user, and a usage situation of another service by the user. As a result, the prediction accuracy of whether or not the user continues to use the service can be increased.

Further, the prediction system S of the second embodiment can cause, within a range in which the business entity can reliably obtain a profit, the user to continue to use the service by identifying, based on the expected profit of the user, candidates for which it is predicted that the user continues to use the electronic payment service.

Further, the prediction system S of the second embodiment can cause continued usage of the service within the range of the maximum value by identifying candidates for which it is predicted that the user continues to use the service, within the range of a maximum value of points corresponding to the expected profit. The user can be caused to continue to use the service within a range in which the business entity can reliably obtain a profit.

Further, the prediction system S of the second embodiment can increase a prediction accuracy by predicting whether or not the user continues to use the service based on at least one of the defection rate of the user from the service, an attribute of the user, a usage situation of the service by the user, and a usage situation of another service by the user.

3. Modification Examples

The present disclosure is not limited to the embodiments described above, and can be modified suitably without departing from the spirit of the present disclosure.

For example, in the first embodiment, there is described an application example of a cloud service, and in the second embodiment, there is described an application example of an electronic payment service, but the prediction system S can be applied to any other service. For example, similarly to the first embodiment, the prediction system S may identify a resource which is required in order to provide a service having a certain quality level in a communication service, and which suppresses a cost to a minimum. Further, for example, similarly to the second embodiment, the prediction system S may determine points to cause a user to continue to use an electronic commerce service and suppress the cost to a minimum. For those other services as well, the prediction system S may identify candidates for which it is predicted that a desired result is obtained in the service.

Further, for example, the functions described as being implemented by the server 10 may be assigned among a plurality of computers. Moreover, for example, the data described as being stored in the data storage module 100 may be stored in another computer or information storage medium different from the server 10.

The invention claimed is:

1. A prediction system, comprising at least one processor configured to:
   acquire a plurality of candidates of information influencing obtaining a desired result in a predetermined service to a user;
   predict, for each of the plurality of candidates, based on a machine learning model trained on parameters which include a set of candidates information, whether the desired result is obtained;
   identify the candidates predicted to obtain the desired result
   wherein the at least one processor is configured to predict whether the reference is satisfied based on at least one of a setting of a first system used in the predetermined service, a situation predicted for the first system, a setting of a second system on which the first system depends, and a situation predicted for the second system, and based on the candidate;
   wherein the at least one processor is configured to provide the identified candidate predicted to satisfy the reference;
   wherein the identified candidate is a resource candidate comprising at least one hardware resource;
   wherein the predetermined service utilizes the identified candidate to obtain the desired result;
   wherein the desired result being greater than or equal to a threshold value for a minimum response speed; and
   wherein the desired result is that the user continues to use the predetermined service.

2. The prediction system according to claim 1,
   wherein as a value indicated by the information becomes higher, the desired result is more likely obtained and a cost relating to the predetermined service becomes higher, and
   wherein the at least one processor is configured to identify the candidate which is predicted to obtain the desired result, and which has a lower cost than another candidate cost.

3. The prediction system according to claim 2, wherein the at least one processor is configured to identify the candidate having a lowest cost among the candidates predicted to obtain the desired result.

4. The prediction system according to claim 1, wherein the at least one processor is configured to predict, for each of the plurality of candidates, whether the desired result is obtained by using a prediction model trained based on training data in which the information is input and whether the desired result is obtained is output.

5. The prediction system of claim 1, where the least one processor is further configured to identify the candidates not predicted to obtain the desired result.

6. The prediction system of claim 1, wherein the desired result is also greater than or equal to a threshold value for a communication speed.

7. A prediction system, comprising at least one processor configured to:
   acquire a plurality of candidates of information influencing obtaining a desired result in a predetermined service;
   predict, for each of the plurality of candidates, based on a machine learning model trained on parameters which include a set of candidates information, whether the desired result is obtained; and
   identify the candidates predicted to obtain the desired result,
   wherein the desired result is a greater than or equal to a threshold value for a minimum response speed,
   wherein the information indicates a privilege to be conferred to a user of the predetermined service,
   wherein the desired result is that the user continues to use the predetermined service,
   wherein the at least one processor is configured to predict, for each of the plurality of candidates, whether the user continues to use the predetermined service,
   wherein the at least one processor is configured to identify the candidate for which it is predicted that the user continues to use the predetermined service;
   wherein the identified candidate is a resource candidate comprising at least one hardware resource; and
   wherein the predetermined service utilizes the identified candidate to obtain the desired result.

8. The prediction system according to claim 7,
   wherein the at least one processor is configured to calculate a defection rate of the user from the predetermined service based on a predetermined calculation method;
   wherein the at least one processor is configured to calculate a maximum value of the privilege conferrable to the user based on the defection rate,
   wherein the at least one processor is configured to identify, within a range of the maximum value, the candidate for which it is predicted that the user continues to use the predetermined service.

9. The prediction system according to claim 8, wherein the at least one processor is configured to determine the defection rate based on at least one of an attribute of the user, a usage situation of the predetermined service by the user, and a usage situation of another service by the user.

10. The prediction system according to claim 7,
    wherein the at least one processor is configured to calculate an expected profit of the user based on a predetermined calculation method, and wherein the at least one processor is configured to identify, based on the expected profit, the candidate for which it is predicted that the user continues to use the predetermined service.

11. The prediction system according to claim 10,
wherein the at least one processor is configured to calculate a maximum value of the privilege conferrable to the user based on the expected profit, and
wherein the at least one processor is configured to identify, within a range of the maximum value corresponding to the expected profit, the candidate for which it is predicted that the user continues to use the predetermined service.

12. The prediction system according to claim 7, wherein the at least one processor is configured to predict whether the user continues to use the predetermined service based on at least one of a defection rate of the user from the predetermined service, an attribute of the user, a usage situation of the predetermined service by the user, and a usage situation of another service by the user.

13. A non-transitory computer-readable information storage medium for storing a program for causing a computer to:
acquire a plurality of candidates of information influencing obtaining a desired result in a predetermined service;
predict, for each of the plurality of candidates, based on a machine learning model trained on parameters which include a set of candidates information, whether the desired result is obtained; and
identify the candidates predicted to obtain the desired result,
wherein the desired result is a greater than or equal to a threshold value for a minimum response speed,
wherein the information indicates a privilege to be conferred to a user of the predetermined service,
wherein the desired result is that the user continues to use the predetermined service,
wherein the program causes the computer to predict, for each of the plurality of candidates, whether the user continues to use the predetermined service,
wherein the program causes the computer to identify the candidate for which it is predicted that the user continues to use the predetermined service;
wherein the identified candidate is a resource candidate comprising at least one hardware resource; and
wherein the predetermined service utilizes the identified candidate to obtain the desired result.

* * * * *